Dec. 21, 1965     E. C. WEBB ETAL     3,224,767
AUTOMATIC PINFALL DETECTING APPARATUS FOR BOWLING GAME
Filed Jan. 24, 1963     2 Sheets-Sheet 1

INVENTORS
ERNEST C. WEBB and
THOMAS H. MURRAY
BY
their ATTORNEY

Dec. 21, 1965    E. C. WEBB ETAL    3,224,767
AUTOMATIC PINFALL DETECTING APPARATUS FOR BOWLING GAME
Filed Jan. 24, 1963    2 Sheets-Sheet 2

INVENTORS
ERNEST C. WEBB and
THOMAS H. MURRAY
BY
their ATTORNEY

United States Patent Office 3,224,767
Patented Dec. 21, 1965

3,224,767
AUTOMATIC PINFALL DETECTING APPARATUS
FOR BOWLING GAME
Ernest C. Webb, Bay Village, Ohio, and Thomas H. Murray, Pittsburgh, Pa., assignors to Cleveland Trust Company, as trustee, Cleveland, Ohio
Filed Jan. 24, 1963, Ser. No. 253,629
5 Claims. (Cl. 273—54)

This invention relates to apparatus for automatically detecting the number of pins which remain standing on a pin deck after each ball is delivered in a bowling game. More particularly, the invention relates to bowling pin detecting apparatus in which the pins can be detected without making physical contact therewith.

As is known, various systems have been proposed for detecting standing pins on a bowling alley pin deck by providing electrically detectable devices in the pins together with apparatus for detecting those devices. For example, in copending application Serial No. 134,809, filed September 7, 1961, a pinfall detecting system is described in which the number of pins knocked down by each ball is determined by first producing a number of electrical impulses corresponding to the number of pins left standing, and thereafter using these impulses to produce a number of signals equal to ten minus the number of aforesaid impulses. This is accomplished in accordance with the said application by providing means in the top or bottom of each pin which can be detected electrically by a proximity device movable along a horizontal plane slightly above the tops or below the bottoms of standing pins and adapted to produce an impulse by passing over the top or under the bottom of any standing pin. For example, the means in the top or bottom of each pin may comprise a solid permanent magnet, and the proximity device may comprise an electrical coil assembly, the arrangement being such that the coil assembly will cut through the lines of flux produced by the permanent magnets whereby a current impulse is induced in the coil assembly each time it passes over or under a standing pin. The permanent magnets of fallen pins, however, cannot affect the coil and, hence, will not produce current impulses. By using the current impulses in circuitry including stepping switches and relays, a number of electrical signals can be obtained equal to ten minus the number of current impulses produced by the coil assembly, these signals being equal in number to the number of fallen pins.

Although a system of the type described above performs exceptionally well for its intended purpose, it employs a solid metal slug or the like in each pin which can be electrically detected, a condition which may be considered undesirable in certain circumstances.

Accordingly, as one object, the present invention seeks to provide bowling pin detecting apparatus in which the pins are detected without providing any solid metallic or the like device in the pins themselves.

Another object of the invention is to provide pinfall detecting apparatus wherein no physical contact is made with the pins.

A further object of the invention is to provide pinfall detecting apparatus wherein ends of the pins are coated with a material containing finely dispersed or powdered particles which may be detected by an electromagnetic device.

Another object of the invention is to provide pinfall detecting apparatus for a bowling game capable of producing electrical signals which may be used in an automatic scoring, totalizing, indicating and/or printing system.

Finally, a further object of the invention is to provide a bowling pin configuration which can be detected in a standing position by electromagnetic means.

In accordance with one embodiment of the invention, the ends of the pins to be detected are provided with a coating containing finely dispersed particles which can be detected magnetically. In the detection process, an electromagnetic device is moved across the tops of standing pins and is adapted to produce lines of flux which pass through coated ends of standing pins, thereby effecting a change in reluctance presented to the flux. By detecting this change in reluctance, the presence of a standing pin can thus be determined. Preferably, the electromagnetic device comprises a U-shaped core having energizing and pickup windings whereon. The energizing winding produces lines of flux which pass through the air gap between opposing legs of the U-shaped electromagnet; and when the lines of flux in the air gap intercept the coated end of a standing pin, a change in reluctance is presented which, in turn, produces a change in current induced in the pickup coil on the core. By detecting this change in current, therefore, the presence of the standing pin is also detected.

In accordance with another embodiment of the invention, the ends of the pins are provided with a coating containing finely dispersed particles of a magnetizable material. In this case, the magnetizable material in the coated ends of standing pins is initially magnetized and thereafter detected by means of an electromagnetic pickup device. The magnetizing means and the pickup device are carried on a bar which sweeps across the ends of coated pins such that the magnetizing device will first pass over the pins, followed by the pickup device which detects lines of flux induced in the magnetizable material.

The above and other objects and features of the invention will become apparent from the following detailed description taken in connection with the accompanying drawings which form a part of this specification, and in which.

Figure 1:
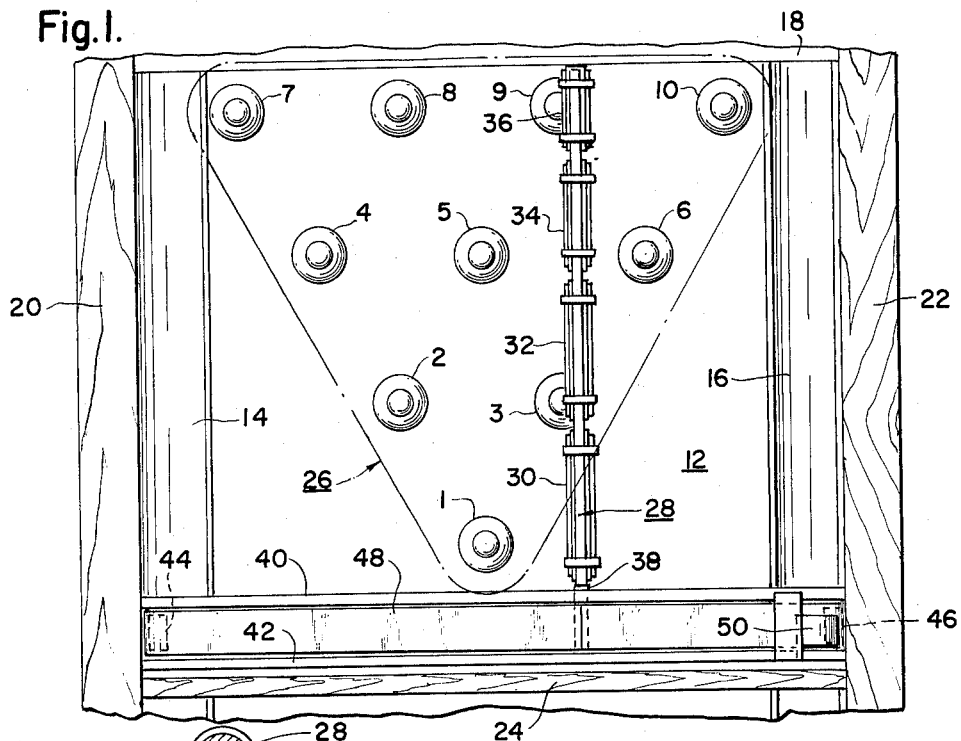
FIGURE 1 is a detailed plan view of the basic detecting apparatus of the present invention.
Figure 3:
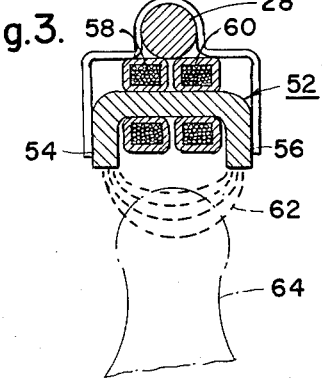
FIG. 3 is a cross-sectional view taken along line III—III of FIG. 2.
Figure 2:
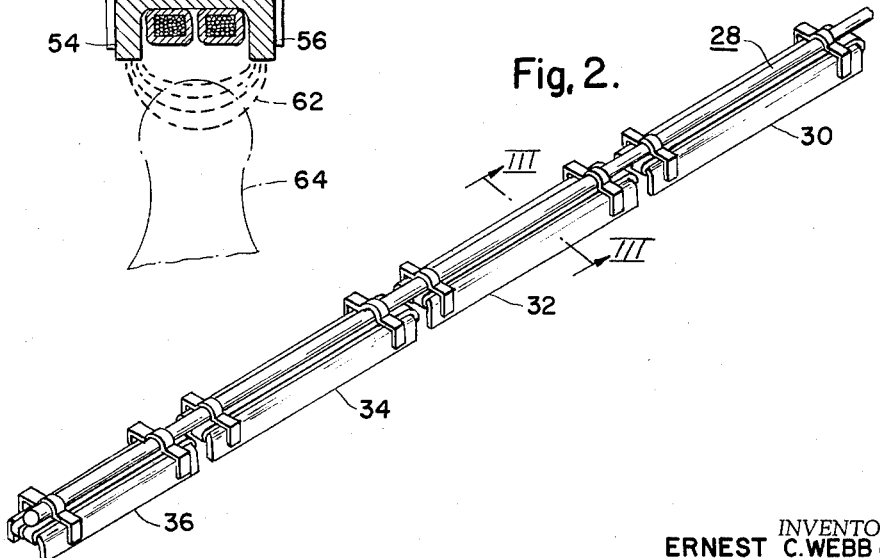
FIG. 2 is a perspective view showing the bar and the electromagnetic devices which sweep across the tops of pins in order to detect them.
Figure 4:
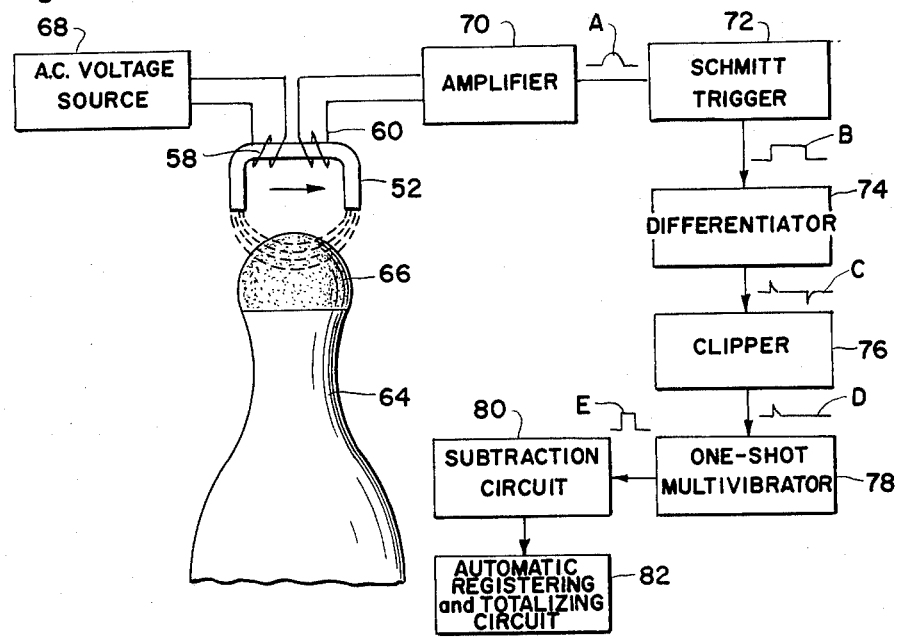
Figure 5:
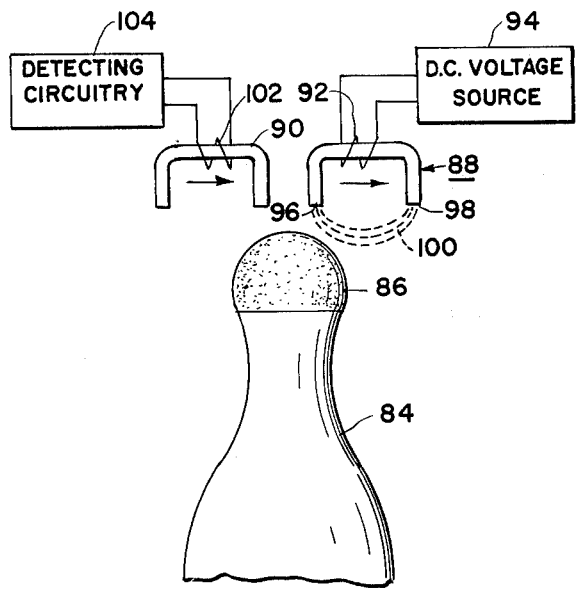

FIG. 4 is a schematic circuit diagram of the embodiment of the invention shown in FIGS. 1, 2 and 3 wherein the pins are detected by a change in reluctance presented to magnetic lines of flux; and FIG. 5 is a schematic circuit diagram of another embodiment of the invention wherein the tops of the pins are coated with a magnetizable substance and the presence of the pin is determined by detecting magnetic lines of flux induced in the magnetizable substance on an end of a pin.

Referring now to the drawings, and particularly to FIG. 1, the usual bowling alley is shown having a pin deck 12 with ten pins positioned thereon in the usual triangular configuration and numbered 1 through 10. On either side of the pin deck 12 are two gutters 14 and 16, while behind the pin deck 12 is a pit 18. On either side of the pin deck 12 are kickbacks 20 and 22 which serve, among other things, to separate adjacent bowling alleys. Extending between the kickbacks 20 and 22 is a facing board 24 which, in accordance with the usual bowling alley construction, covers an automatic pin-spotter and its associated mechanism in its raised position, but does not extend down far enough toward the alley to obstruct the view of pins positioned thereon. The outline of the main portion of the pin-spotter is indicated at 26.

Adapted to pass over the tops of the pins 1–10 and beneath the pin-spotter 26 in its raised position is a bar 28 which carries four spaced electromagnetic devices 30, 32, 34 and 36. The bar 28 and the electromagnetic devices 30–36 carried thereby are suspended from a carriage 38 in cantilever beam relationship, this carriage 38 being movable along guideways or tracks 40 and 42 both located at the forward end of the pin-spotter 26 and extending between the kickbacks 20 and 22.

The carriage 38 and the bar 28 carried thereby are moved back and forth across the pin deck along guideways 40 and 42 by means of a mechanism which is the subject of copending application Serial No. 199,063, filed May 31, 1962. For a full and detailed description of the traversing mechanism, reference may be had to the aforesaid application; however for purposes of the present application it will be sufficient to state that at opposite ends of the guideways 40 and 42 are rolls 44 and 46 rotatable about horizontal axes standing parallel to the long transverse dimension of the bowling alley. Extending around the rolls 44 and 46 is a taut band 48 of spring steel or the like. This band has its opposite ends securely connected to the carriage 38, the arrangement being such that as the band moves around the rolls 44 and 46, the carriage 38 and the member 28 carried thereby will traverse the pin deck 12 on guideways 40 and 42. A motor 50 is employed to rotate the roll 46, and this causes the band 48 to move around rolls 44 and 46 in a manner which is more fully explained in the aforesaid copending application Serial No. 199,063.

In the operation of the device, the motor 50 is caused to rotate in one direction after the delivery of one ball in a frame to cause the member 28 to sweep from left to right, for example, as viewed in FIG. 1. Upon delivery of the next ball, the direction of rotation of the motor 50 is reversed and the bar 28 is caused to sweep across the pin deck 12 from right to left. When the bar 28 is not in use, it is stored or maintained at the extremities of the guideways 40 and 42 adjacent the kickback 20 or 22 where it is out of the downward path of travel of the pin-spotter 26. Thus, at all times except during a pin-counting operation, the member 28 and the electromagnetic devices 30-36 carried thereby will be in close abutting relationship with kickback 20 or kickback 22. During a pin-counting operation, the member 28 moves from one kickback to the other kickback and remains in this position until the next pin-counting operation commences, whereupon it will move back across the pin deck 12 in the opposite direction.

As will hereinafter be more fully explained, each of the electromagnetic devices 30-36 is adapted to detect standing pins directly beneath it, the arrangement being such that as any electromagnetic device sweeps across the top of a standing pin, an electrical pulse will be produced to indicate the presence of that standing pin. From a consideration of the triangular configuration of pins shown in FIG. 1, the necessity for a plurality of electromagnetic devices on the member 28 will be understood. That is, it can be seen from FIG. 1 that the number 1 pin is directly in front of the number 5 pin. Similarly, the number 2 pin is directly in front of the number 8 pin, and the number 3 pin is directly in front of the number 9 pin. If a single electromagnetic device were swept across the tops of the pins, a single current impulse would be produced by that device for both of the pins 2 and 8, both of the pins 1 and 5, and both of the pins 3 and 9, meaning that if all of the pins were standing, only seven current impulses would be produced by the single coil; whereas it is desired to produce ten impulses. With the arrangement of the four electromagnetic devices shown in FIG. 1, however, none of the pins covered by any one electromagnetic device is aligned with other pins covered by that same device so that the cumulative number of impulses produced by the four devices will always be ten, assuming that all of the pins are left standing. Of course, if certain ones of the pins are knocked down after a ball is delivered, only the cumulative number of impulses corresponding to the number of pins left standing will be produced by the coils. Furthermore, even though certain ones of the pins may slide on the deck to positions where they are directly in front of other pins, the correct number of impulses will always be produced. This is more fully explained in copending application Serial No. 134,809, filed September 7, 1961.

With reference, now, to FIGS. 2 and 3, each of the electromagnetic devices 30-36 comprises a generally U-shaped core 52 (FIG. 3) having a pair of downwardly-depending legs 54 and 56. Wrapped around the horizontally-extending portion of each core 52 is an input winding 58 and an output or pickup winding 60. As will hereinafter be more fully explained, the input winding 58 is connected to a source of energizing voltage so as to induce lines of flux in the core 52. These lines of flux will pass through the air gap between the downwardly-depending legs 54 and 56 as at 62. The lines of flux in core 52 will, of course, induce a current in the pickup coil 60, and this current will remain substantially constant assuming that no magnetically detectable device is introduced into the lines of flux 62 passing through the air gap. In accordance with the present invention, the top of each pin 64 is coated with a paint or other similar substance containing a finely dispersed or powdered magnetically detectable substance. Preferably, the magnetically detectable substance is magnetically permeable such as magnetite (magnetic iron oxide). Thus, when the core 52 passes over the top of a standing pin, the lines of flux 62 will intercept the finely dispersed particles in the top of the coated pin to effect a change in reluctance for the lines of flux 62. In the particular example illustrated, the magnetically permeable material in the coating on the top of the pin will reduce the reluctance presented to the lines of flux, thereby increasing the current induced in the pickup coil 60.

Alternatively, the top of each pin can be coated with a substance containing finely dispersed particles of copper or other similar material which, upon the passage of magnetic lines of flux 62 therethrough, will induce eddy currents. These eddy currents will then alter the flux density in the core 52 and, hence, the current induced in the pickup coil 60. As will be understood, the electromagnetic devices 30-36 produce lines of flux which will pass through the tops of standing pins, but cannot pass through the tops of fallen pins. Consequently, by detecting changes in the current induced in the pickup windings 60 on the devices 30-36, the number of standing pins can be determined. That is, the output windings 60 on each of the electromagnetic devices 30-36 will produce discrete electrical signals, the number of which is equal to the number of standing pins. By electrically subtracting this discrete number of electrical signals from ten, the number of fallen pins can be determined.

A system for achieving the foregoing is shown in FIG. 4. The input winding 58 on core 52 is energized by means of an alternating current voltage source 68; however a direct current voltage source may be used if desired. The pickup winding 60 is connected, as shown, through an amplifier 70 to a Schmitt trigger circuit 72. As the core 52 passes over a pin 64 having a coating 66 on its upper end containing magnetically permeable material, the current induced in the pickup winding 60 will increase to produce a wave form A at the output of amplifier 70. The wave form A comprises a voltage or current impulse, the height and width of which depend upon the speed of the number 28 across the pin deck as well as other factors. In order to refine the wave form A in order to produce sharp, clear pulses which can be readily detected, circuitry including the Schmitt trigger 72 is employed.

As is well known to those skilled in the art, a Schmitt trigger circuit is a type of multivibrator having two stable states of conduction. Normally, the Schmitt trigger circuit will be in one of its two stable states of conduction. When, however, the magnitude of an input signal exceeds a predetermined limit, the states of conduction of the Schmitt trigger circuit will reverse and remain reversed until the input signal falls below the aforesaid predetermined level. Consequently, the output of the Schmitt trigger circuit is a square wave (wave form B) which persists as long as the wave form A exceeds the aforesaid predetermined voltage level. The output of the Schmitt trigger circuit 72 (wave form B) is applied to a differentiator 74. The differentiator 74 is a circuit in which the voltage amplitude at the output is proportional at any instant to the rate of change of voltage amplitude at the input. The voltage wave form C appearing at the output of differentiator 74 will, therefore, be a series of sharp voltage pulses which occur in time at the points where the input square-wave signal B changes from one voltage level to another. As the voltage changes in a positive direction, the sharp pulse produced by the differentiator is also positive; whereas when the voltage changes in a negative direction the converse is true so that a negative sharp voltage pulse will appear at the trailing edge of the square-wave signal B. The negative sharp pulse is eliminated from wave form C in a clipper 76 to produce wave form D wherein only the positive sharp pulse remains. This pulse is applied to a one-shot multivibrator 78 which, in response to the pulse in wave form D, will produce an output wave form E comprising a sharply defined square-wave pulse of fixed width.

Thus, assuming that the core 52 is for the electromagnetic device 36 shown in FIG. 1 and that all of the pins 7–10 are standing, four pulses (wave form E) will be produced at the output of the one-shot multivibrator 78. Similarly, if all of the pins 4–6 remain standing, three pulses will be produced by the electromagnetic device 34.

Each of the devices 30–36 must be provided with circuitry similar to that shown in FIG. 4; and although it may be possible to employ the pulses in wave form A directly for this purpose, it is preferable to refine the pulses in the manner described above. The pulses in wave form E will, therefore, be equal in number to the number of standing pins in any zone covered by a particular electromagnetic device 30–36 as the member 28 sweeps across the pin deck. The pulses from all of the electromagnetic devices are then applied to a substraction circuit 80 of the type shown in copending Application Serial No. 175,865, filed February 9, 1962, now U.S. Patent No. 3,124,355, issued March 10, 1964, where they are subtracted from ten in order to obtain a number of pulses equal to the number of fallen pins. These latter pulses are then fed to automatic registering and totalizing circuitry 82 such as that shown in the aforesaid U.S. Patent No. 3,124,355.

In FIG. 5, another embodiment of the invention is shown wherein the top of a bowling pin 84 is coated with a paint or other substance containing a magnetizable material 86. The magnetizable material used in the coating 86 must be such that it has reasonable remanence or retentivity, meaning that when the material is placed under the influence of a magnetic field and the field then removed, a certain amount of flux will be retained in the material for a period of time. The magnetizable material in coating 86 may include, without limitation, gamma ferric oxide, unicrystalline iron, small particle magnetic alloys, cobalt, nickel and barium ferrites, and other similar materials. These materials are the same as those used in the well-known "magnetic inks."

In the embodiment of FIG. 5, two cores 88 and 90 must be employed for each of the electromagnetic devices 30, 32, 34 and 36 shown in FIG.. Furthermore, the one core 88, called the "energizing" core must precede the other core 90, called the "pickup" core in the path of travel of member 28 across the tops of the pins. This means, of course, that if only one energizing core 88 is employed, the member 28 must always sweep across the tops of the pins in the same direction during a detecting operation. Alternatively, two energizing cores 88 could be placed on either side of the pickup core 90 such that the magnetizable material 86 in the top of a pin would be magnetized prior to the passage of the pickup core 90 thereover.

The energizing core 88 in the embodiment of FIG. 5 is provided, as shown, with a winding 92 which is connected to a source of direct current voltage 94. Thus, the voltage source 94 and winding 92 will induce lines of flux in the energizing core 88, and these lines of flux will pass across the air gap between the downwardly-depending legs 96 and 98 of the energizing core 88 as at 100. When these lines of flux pass through the magnetizable material 86 in the top of pin 84 as member 28 sweeps across the tops of the pins, the magnetizable particles will become magnetized and will retain a certain amount of flux density after the core 88 passes thereover. Thereafter, the pickup core 90 will pass over the previously magnetized material 86 in the top of pin 84 to induce a current impulse in winding 102. This current impulse will correspond to the pulse in wave form A shown in FIG. 4 and is used in circuitry similar to that shown in FIG. 4, schematically illustrated at 104 in FIG. 5. In both FIGS. 4 and 5, standing pins will be detected by virtue of the fact that magnetic lines of flux will pass through their upper coated ends; whereas fallen pins cannot be detected since their ends will be removed from the magnetic field.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. Apparatus for detecting standing pins on a bowling alley pin deck, said pins each having a coating containing a magnetically detectable substance on an end thereof, said apparatus comprising a generally U-shaped magnetically permeable member arranged to pass into close proximity to the ends of standing pins, a pair of windings inductively coupled to said magnetically permeable member, a source of energizing voltage connected to one of said windings for inducing lines of flux in the magnetically permeable member and across the air gap between opposing legs of the U-shaped member, and means connected to the other of said windings for detecting a change in current induced therein, the arrangement being such that when the U-shaped member moves into close proximity to the end of a standing pin, the magnetic lines of flux will pass through the magnetically detectable substance in said coating to produce a change in the current induced in said other winding.

2. The apparatus of claim 1 wherein the magnetically detectable substance is magnetically permeable.

3. Apparatus for detecting standing pins on a bowling alley pin deck, said pins each having a coating containing a magnetizable substance on an end thereof, said apparatus comprising a member movable past said ends of the pins along a substantially horizontal path, first means on said member for magnetizing the magnetizable substance in the ends of standing pins as said member moves across the ends of the pins along its horizontal path of travel, and second means on said member behind said first means along the path of travel of the member for detecting magnetic lines of flux induced in said magnetizable substance by the first means, the arrangement being such that the second means will produce an electrical signal each time it passes over the end of a standing pin which has previously been magnetized by said first means.

4. Apparatus for detecting standing pins on a bowling alley pin deck, said pins each having a coating containing a magnetically detectable substance on an end thereof, said apparatus comprising a magnetically permeable core member providing a closed path for magnetic lines of flux and having an air gap in said path, first winding means inductively coupled to said core member for inducing lines of flux therein, means for moving said core member into close proximity to said coated ends of standing pins whereby the magnetic lines of flux across said air gap will pass through the magnetically detectable substance in said coating, and second winding means inductively coupled to said core member for detecting a change in reluctance presented to said lines of flux across the air gap when the electromagnetic means is in close proximity to the coated end of a standing pin.

5. The apparatus of claim 4 wherein said magnetically detectable substance comprises a magnetically permeable material.

References Cited by the Examiner
UNITED STATES PATENTS

| | | | |
|---|---|---|---|
| 2,613,933 | 10/1952 | Johns et al. | 273—54 |
| 2,980,424 | 4/1961 | Sanders et al. | 273—54 X |
| 2,980,425 | 4/1961 | Zaander | 273—52 X |
| 3,037,771 | 6/1962 | Gambino | 273—82 |
| 3,091,456 | 5/1963 | Brodie | 273—54 |
| 3,093,375 | 6/1963 | Shaw et al. | 273—52 |
| 3,104,105 | 9/1963 | Jolitz et al. | 273—82 |

DELBERT B. LOWE, *Primary Examiner.*